US012522494B2

(12) United States Patent
Bernas et al.

(10) Patent No.: US 12,522,494 B2
(45) Date of Patent: Jan. 13, 2026

(54) INSULATED CONTAINER SYSTEM FOR TRANSPORTING AND DISPENSING PRESSURIZED COLD LIQUIDS

(71) Applicant: Cooler Keg LLC, Crescent Springs, KY (US)

(72) Inventors: Anthony Bernas, Liberty Township, OH (US); Kyle Schmidt, Clermont, FL (US)

(73) Assignee: Cooler Keg LLC, Crescent Springs, KY (US)

( * ) Notice: Subject to any disclaimer, the term of this patent is extended or adjusted under 35 U.S.C. 154(b) by 286 days.

(21) Appl. No.: 18/308,551

(22) Filed: Apr. 27, 2023

(65) Prior Publication Data
US 2023/0348255 A1    Nov. 2, 2023

Related U.S. Application Data

(60) Provisional application No. 63/337,505, filed on May 2, 2022.

(51) Int. Cl.
*B67D 1/08* (2006.01)
*F25D 31/00* (2006.01)

(52) U.S. Cl.
CPC ......... *B67D 1/0891* (2013.01); *B67D 1/0844* (2013.01); *B67D 1/0857* (2013.01); *F25D 31/007* (2013.01); *F25D 2303/08222* (2013.01); *F25D 2303/0843* (2013.01); *F25D 2303/0845* (2013.01); *F25D 2331/805* (2013.01)

(58) Field of Classification Search
CPC .. B67D 1/0891; B67D 1/0844; B67D 1/0857; B67D 2210/00044; B67D 2210/00128; B67D 1/0406; F25D 31/007; F25D 2303/08222; F25D 2303/0843; F25D 2303/0845; F25D 2331/805; F25D 2303/082; F25D 2331/802; F25D 3/06
See application file for complete search history.

(56) References Cited

U.S. PATENT DOCUMENTS

| | | | |
|---|---|---|---|
| 7,490,739 B2 | 2/2009 | Prabucki | |
| 7,721,567 B2 | 5/2010 | Dalton et al. | |
| 8,453,882 B2 | 6/2013 | Johnson | |

(Continued)

FOREIGN PATENT DOCUMENTS

| | | | | |
|---|---|---|---|---|
| GB | 2439555 A | * | 1/2008 | ........... B67D 1/0418 |
| WO | WO-9324797 A1 | * | 12/1993 | ......... B65D 21/0204 |

OTHER PUBLICATIONS

International Search Report dated Jul. 17, 2023 pertaining to International application No. PCT/US2023/020271 filed Apr. 27, 2023, 1 page.

(Continued)

*Primary Examiner* — Donnell A Long
(74) *Attorney, Agent, or Firm* — DINSMORE & SHOHL LLP (57) ABSTRACT

A container system for transporting and dispensing liquid, the system including: a container, including: an enclosure; a lid pivotably attached to the enclosure; and a bulkhead fitting disposed in the lid; a tap assembly removably connected to the bulkhead fitting; and a base tray positioned in the enclosure, including one or more cooling packs having one or more recessed pockets, each configured to receive a liquid container.

19 Claims, 8 Drawing Sheets

(56) References Cited

U.S. PATENT DOCUMENTS

| 9,676,604 B2* | 6/2017 | MacDonald | B67D 1/06 |
| 11,662,131 B1* | 5/2023 | Black | F25D 23/12 |
| | | | 222/146.6 |
| 2010/0199711 A1* | 8/2010 | Smith | A45C 11/20 |
| | | | 224/257 |
| 2014/0367418 A1 | 12/2014 | Mcnitt et al. | |

OTHER PUBLICATIONS

International Preliminary Report and Patentability dated Oct. 29, 2024 pertaining to International application No. PCT/US2023/020271 filed Apr. 27, 2023, 6 pages.

\* cited by examiner

INSULATED CONTAINER SYSTEM FOR TRANSPORTING AND DISPENSING PRESSURIZED COLD LIQUIDS

CROSS-REFERENCE TO RELATED APPLICATION

This application claims priority to and the benefit of U.S. Provisional Patent Application No. 63/337,505, filed May 2, 2022, the disclosure of which is incorporated herein by reference in its entirety.

TECHNICAL FIELD

This patent application is directed to insulated containers, and more specifically, to insulated containers for transporting and dispensing pressurized cold beverages.

BACKGROUND

Craft beers and beverages have grown significantly in popularity over the last several decades. These beverages are best enjoyed on draft with a carbon dioxide or nitrogen propellant. For example, beers on tap or draft beers are relatively easy to provide at an establishment. However, it is more difficult to provide beverages on tap while on the go as the necessary equipment and cooling apparatus of conventional systems is too heavy and bulky to easily transport for activities such as e.g., camping, boating, tailgating, and picnicking, to name a few. Accordingly, there is a need to conveniently provide portable beverages on draft.

SUMMARY

In some aspects, the techniques described herein relate to a container system for transporting and dispensing liquid, the system including: a container, including: an enclosure; a lid pivotably attached to the enclosure; and a bulkhead fitting disposed in the lid; a tap assembly removably connected to the bulkhead fitting; and a base tray positioned in the enclosure, including one or more cooling packs having one or more recessed pockets, each configured to receive a liquid container.

In some aspects, the techniques described herein relate to a container system, wherein the base tray includes three cooling pack sections forming two recessed pockets when positioned in the enclosure.

In some aspects, the techniques described herein relate to a container system, further including a pair of liquid containers, each positioned in a corresponding one of the two recessed pockets.

In some aspects, the techniques described herein relate to a container system, wherein each cooling pack section includes mating pins and sockets to facilitate stacking the cooling pack sections.

In some aspects, the techniques described herein relate to a container system, further including an accessory tray positioned in the enclosure.

In some aspects, the techniques described herein relate to a container system, further including a regulator disposed on the accessory tray.

In some aspects, the techniques described herein relate to a container system, wherein the bulkhead fitting includes a first portion extending into an opening formed in the lid and a second portion mated with the first portion, and wherein the first portion includes a plurality of grooves configured such that the tap assembly is rotated to lock the tap assembly to the bulkhead fitting.

In some aspects, the techniques described herein relate to a container system for transporting and dispensing liquid, the system including: an insulated container, including: an insulated enclosure; an insulated lid pivotably attached to the insulated enclosure; and a bulkhead fitting disposed in the insulated lid; a tap assembly removably connected to the bulkhead fitting; a base tray including three cooling pack sections forming two recessed pockets when positioned in the insulated enclosure; a pair of beverage containers, each positioned in a corresponding one of the two recessed pockets and connected to the tap assembly; and a pressure regulator connected to the pair of beverage containers.

In some aspects, the techniques described herein relate to a container system, wherein each cooling pack section includes mating pins and sockets to facilitate stacking the cooling pack sections.

In some aspects, the techniques described herein relate to a container system, further including an accessory tray positioned in the enclosure.

In some aspects, the techniques described herein relate to a container system, wherein the regulator is disposed on the accessory tray.

In some aspects, the techniques described herein relate to a container system, wherein the bulkhead fitting includes a first portion extending into an opening formed in the insulated lid and a second portion mated with the first portion, and wherein the first portion includes a plurality of grooves configured such that the tap assembly is rotated to lock the tap assembly to the bulkhead fitting.

In some aspects, the techniques described herein relate to a container system for transporting and dispensing liquid, the system including: a bulkhead fitting attachable to the lid of a container; a tap assembly removably connectable to the bulkhead fitting; and a base tray positionable in the container, including one or more cooling pack containers having one or more recessed pockets each configured to receive a liquid container.

In some aspects, the techniques described herein relate to a container system, wherein the base tray includes three cooling pack sections.

In some aspects, the techniques described herein relate to a container system, further including a pair of liquid containers.

In some aspects, the techniques described herein relate to a container system, wherein each cooling pack section includes mating pins and sockets to facilitate stacking the cooling pack sections.

In some aspects, the techniques described herein relate to a container system, further including an accessory tray.

In some aspects, the techniques described herein relate to a container system, further including a regulator.

In some aspects, the techniques described herein relate to a container system, wherein the bulkhead fitting includes a first portion and a second portion mated with the first portion, and wherein the first portion includes a plurality of grooves configured such that the tap assembly is rotated to lock the tap assembly to the bulkhead fitting.

BRIEF DESCRIPTION OF THE DRAWINGS

The insulated container system described herein may be better understood by referring to the following Detailed Description in conjunction with the accompanying drawings, in which like reference numerals indicate identical or functionally similar elements.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the systems and devices introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

Disclosed herein are insulated containers, e.g., coolers, with a bulkhead fitting attached to the lid and configured to receive a tap assembly. The cooler can include a pair of mini kegs positioned on a base tray comprising multiple molded ice packs having recesses shaped to receive a bottom portion of the kegs. An accessory tray can be positioned near the opening of the cooler. The accessory tray carries a regulator and gas cartridges (e.g., carbon dioxide or nitrogen).

Figure 1A:
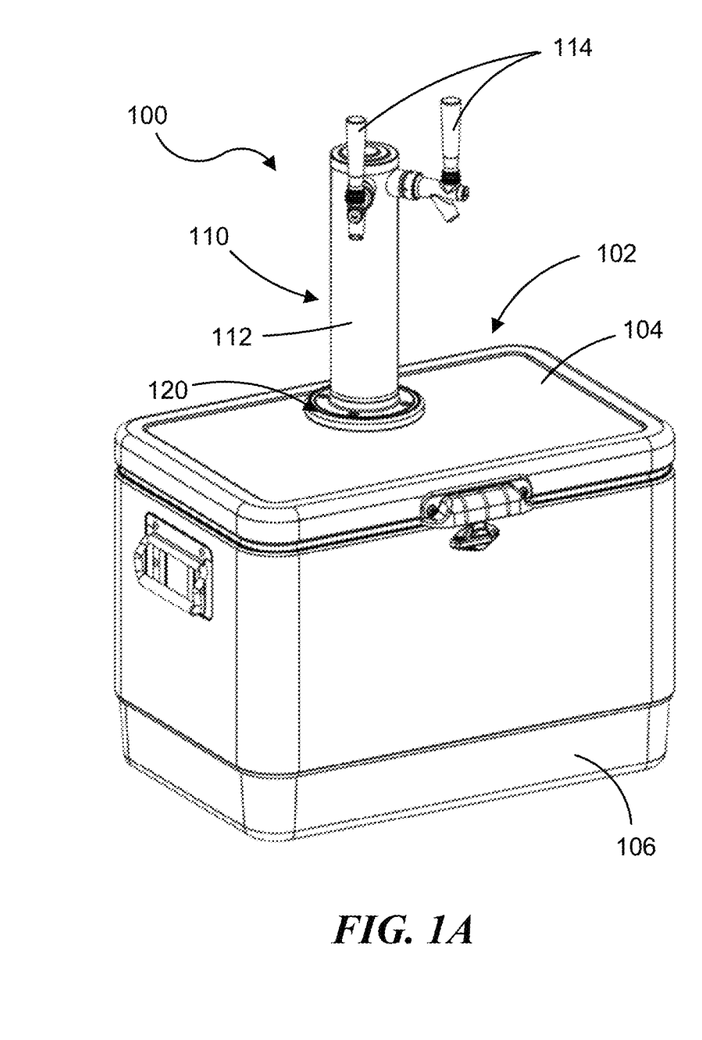
FIG. 1A is a isometric view of an insulated container system according to a representative embodiment of the disclosed technology.
Figure 1B:
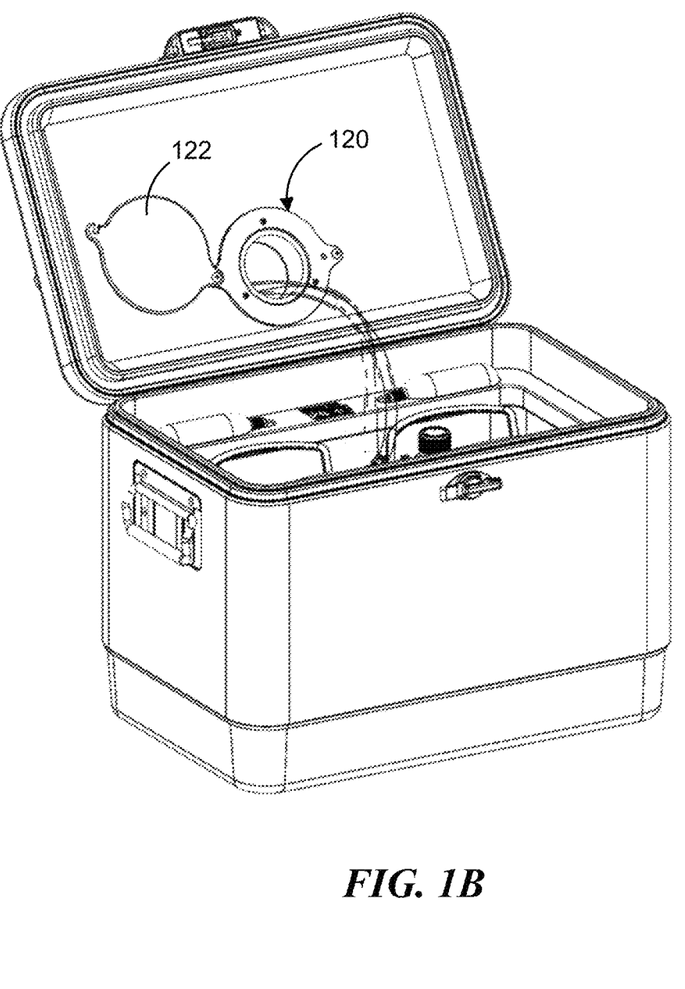
FIG. 1B is an isometric view of the insulated container system shown in FIG. 1A with the lid in the open position.

FIGS. 1A and 1B illustrate an insulated container system 100 for transporting and dispensing pressurized cold liquids, such as delicious beer. Although the technology is described herein with respect to cold liquids, it should be appreciated that the disclosed insulated container systems can help maintain the temperature of warm or hot liquids as well. In some embodiments, the insulated container system 100 can include an insulated container (e.g., cooler) 102. The cooler 102 can include e.g., an insulated enclosure 106 and a hinged lid 104. The insulated container system 100 can also include a tap assembly 110 removably connected to a bulkhead fitting 120 disposed in the lid 104. The tap assembly 110 can include a stanchion tube 112 and one or more dispensing valves or taps 114. In some embodiments, the bulkhead fitting 120 can include a pivoting cover 122 to seal the lid 104 when the tap assembly 110 is not installed in the bulkhead fitting 120, thereby helping keep the contents of the cooler 102 cold. When the tap assembly 110 is removed and the cover 122 is in position, the bulkhead fitting 120 can function as a cup holder.

Figure 2:
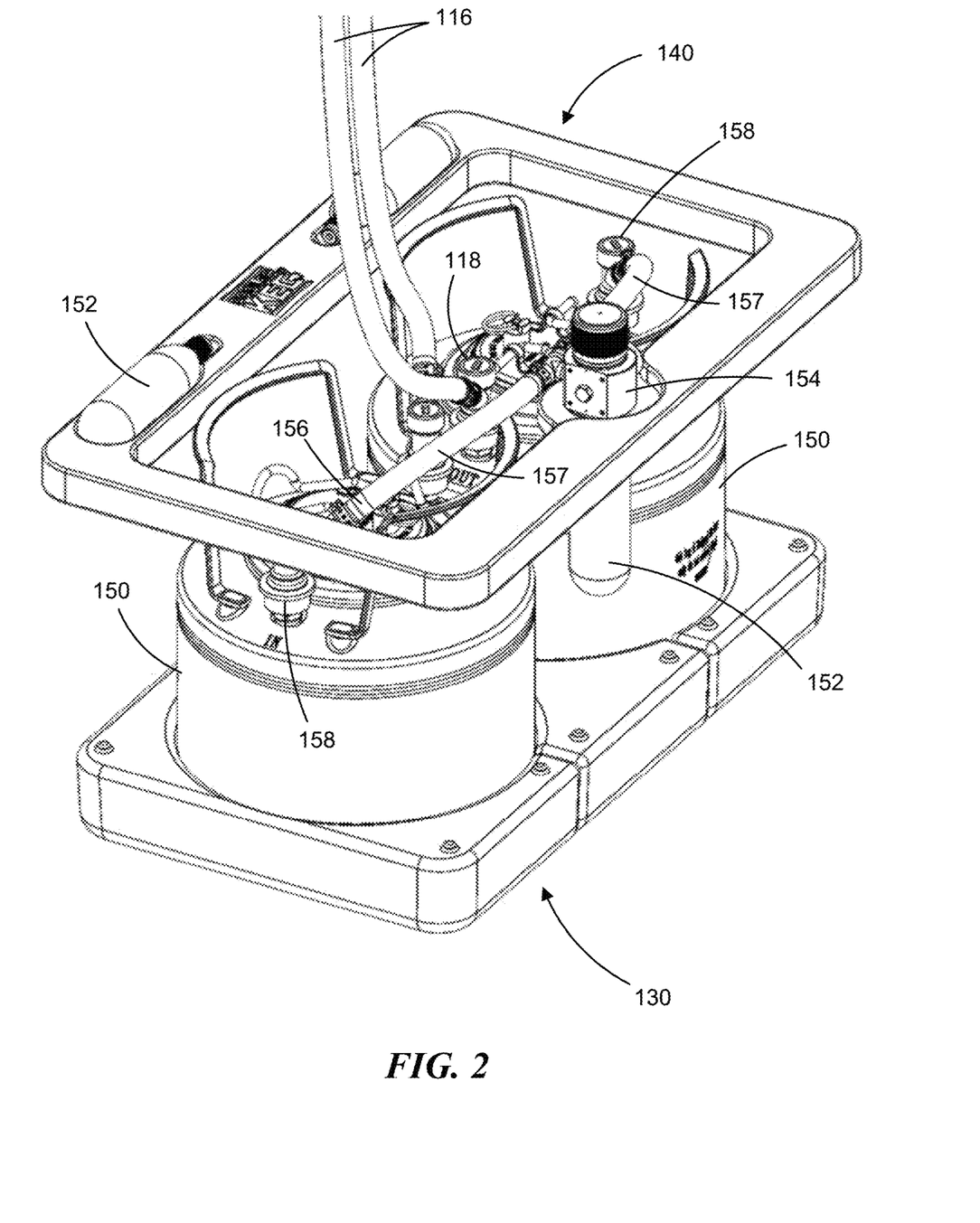
FIG. 2 is an isometric view of the interior components of the insulated container system shown in FIGS. 1A and 1B.

With reference to FIG. 2, insulated container system 100 can include a base tray 130 comprising an ice pack or multiple ice packs having recesses shaped to receive a bottom portion of a pair of liquid containers, such as min-kegs 150, for example. The insulated container system 100 can also include a gas cartridge 152 and an associated regulator 154. The regulator 154 controls the gas pressure to the mini-kegs 150 which are connected to the taps 114 (FIG. 1A) via feed lines 116. The regulator 154 and spare cartridges 152 are carried by an accessory tray 140 as shown. In some embodiments, the feed lines 116 can include quick release fittings 118 to facilitate convenient removal of the tap assembly 110. The regulator 154 is connected to the mini-kegs 150 via regulator lines 157 and connectors 158. A one-way valve 156 can be included between the regulator 154 and the connector 158 on each of the mini-kegs 150. It should be appreciated that while two mini-kegs are shown in the depicted embodiment, a single keg or additional kegs can be used. In some embodiments, the kegs 150 only have one handle or no handles to provide additional room in the cooler to store the tap assembly 110 within the cooler. Furthermore, kegs or liquid containers of different sizes and/or shapes other than mini-kegs can be used as well. While the base tray 130 is an ice pack, additional ice, e.g., cubes, can be packed in open areas around the kegs 150, such as between the kegs, in the corners of the cooler, and on top of the kegs.

Figure 3:
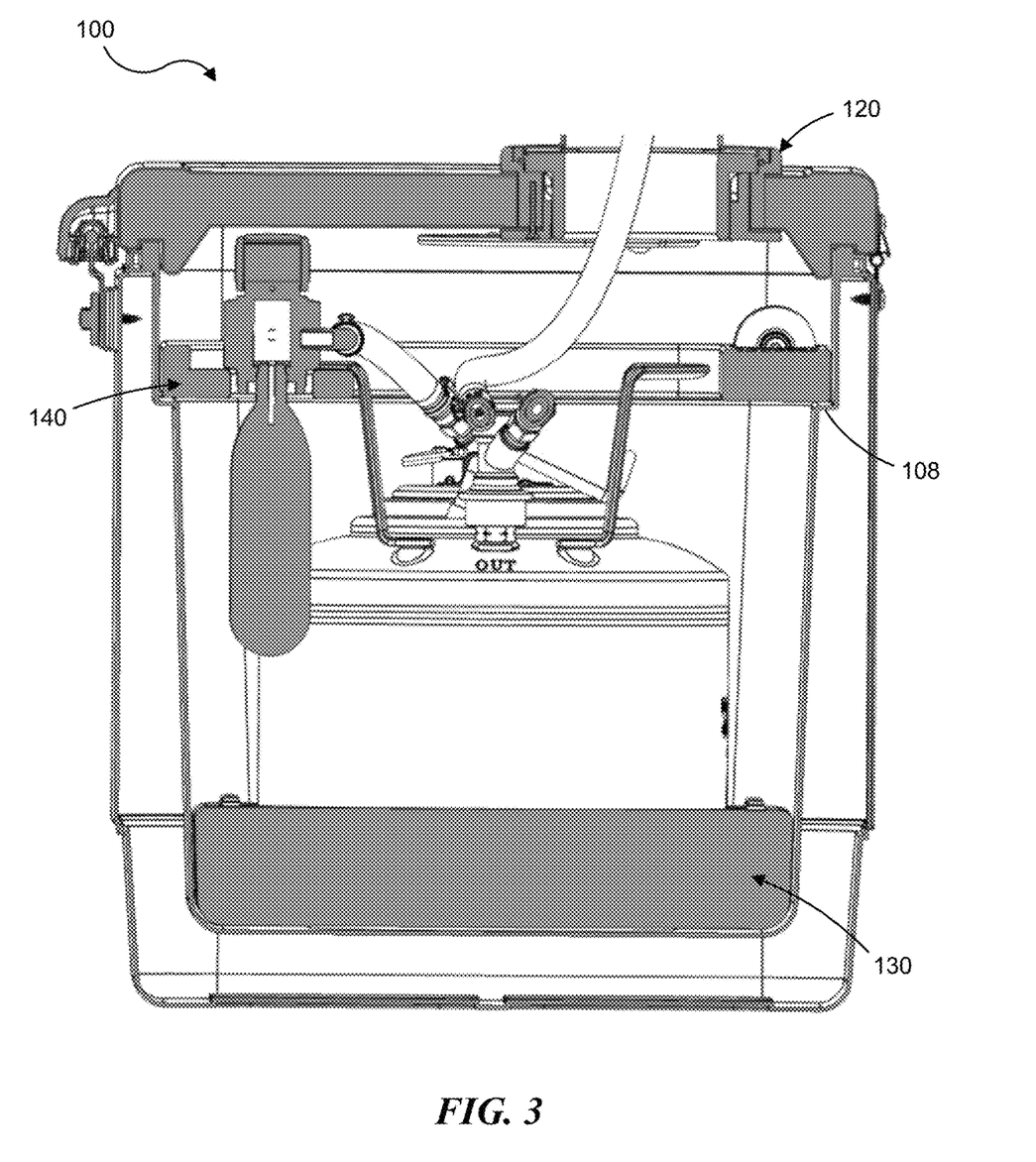
FIG. 3 is a side-view in cross-section of the insulated container system as shown in FIGS. 1A-2.

FIG. 3 illustrates the locations of the components of the insulated container system 100 inside the cooler 102. For example, the base tray 130 is positioned at the bottom of the cooler and the accessory tray 140 is positioned near the opening of the cooler on a shoulder 108. The bulkhead fitting 120 extends through an opening in the cooler lid as shown.

Figure 4A:
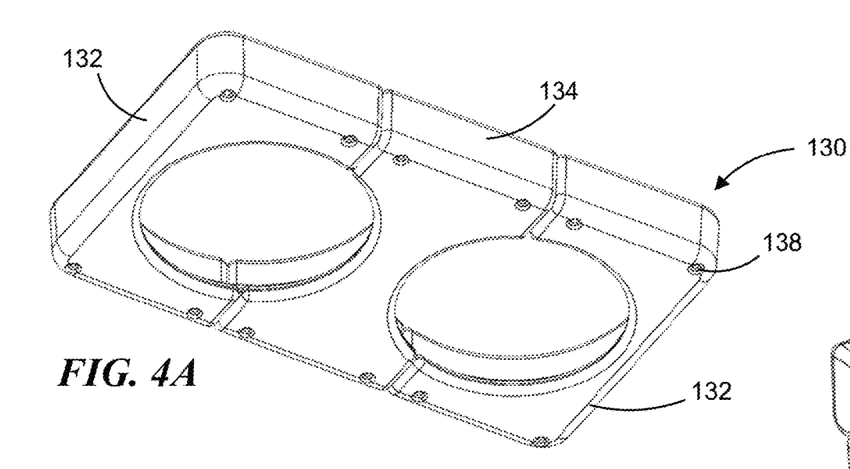
FIG. 4A is an isometric view of the base tray shown in FIGS. 2 and 3 as viewed from below.
Figure 4B:
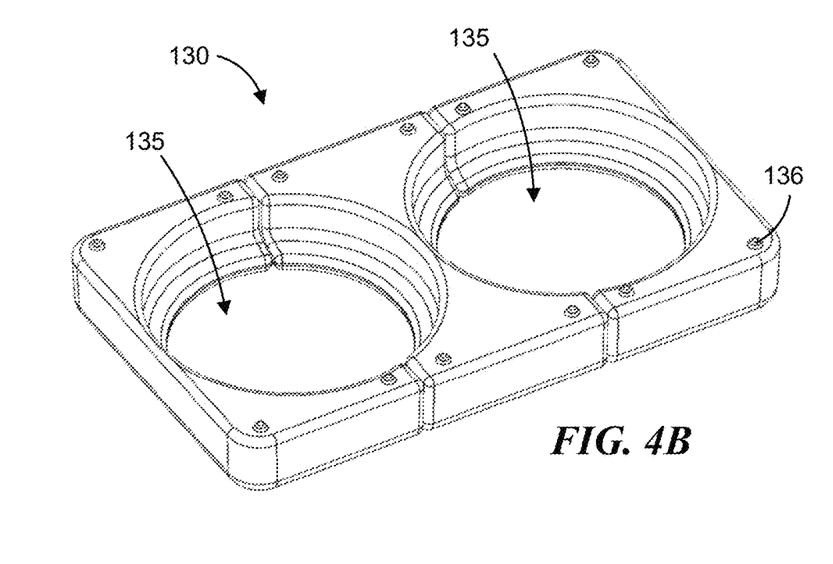
FIG. 4B is an isometric view of the base tray shown in FIGS. 2-4A as viewed from above.
Figure 4C:
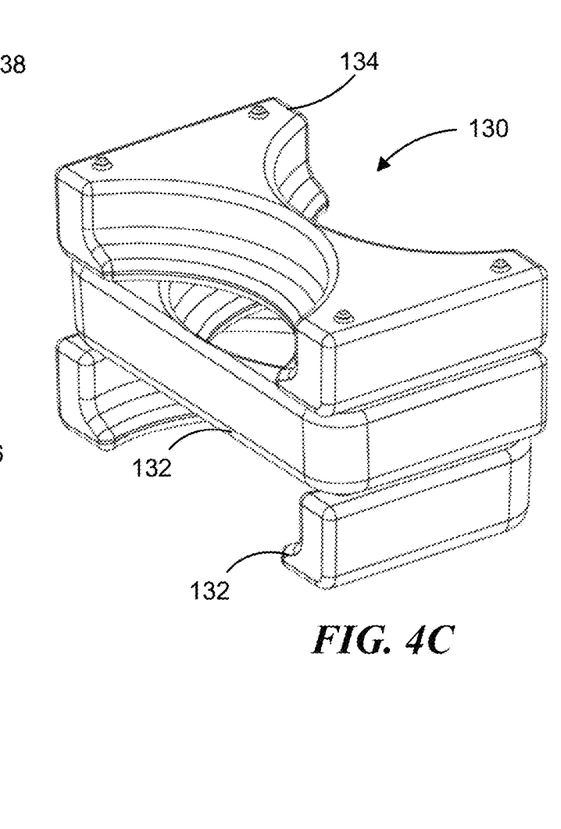
FIG. 4C is an isometric view of the base tray components in a stacked arrangement.

FIGS. 4A-4C illustrate the base tray 130 according to a representative embodiment. In the depicted embodiment, the base tray 130 comprises three sections; two end sections 132 and a middle section 134. The base tray sections can be cooling packs, such as molded plastic ice pack containers filled with a freezable liquid. Each section can include mating pins 136 and sockets 138 to facilitate stacking the ice pack sections for storage in a freezer as shown in FIG. 4C. When the sections are arranged as shown in FIG. 4B, the sections form two recessed pockets 135 each configured to receive a mini-keg. In some embodiments, the base tray 130 can be provided with a disc-shaped section that fits into the recessed pockets 135 to provide additional cooling for contents placed in the cooler when one or more of the mini-kegs is not used. In some embodiments, the base tray sections can each include a sealable port to fill an interior region of the container with liquid or gel.

Figure 5:
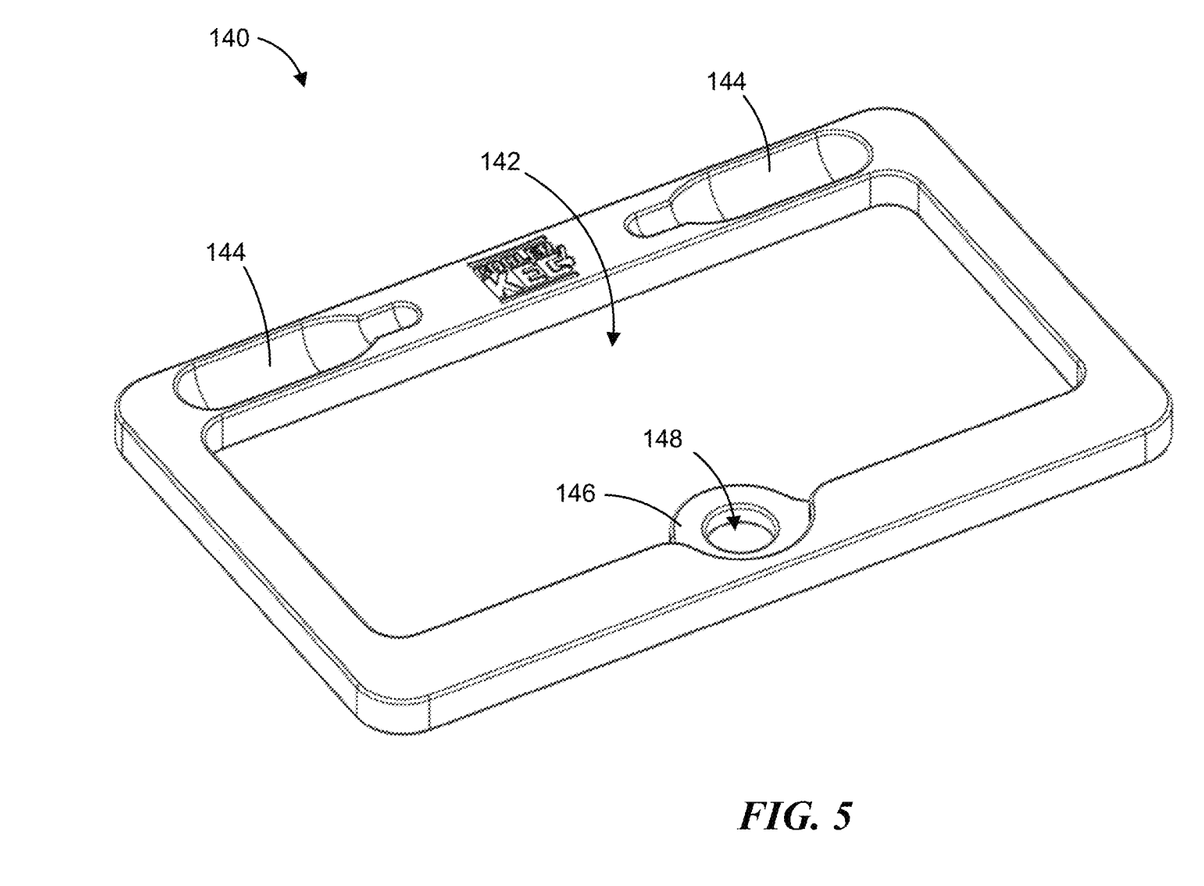
FIG. 5 is an isometric view of the accessory tray shown in FIG. 1B-3.

As shown in FIG. 5, the accessory tray 140 includes a large opening 142 to allow access to the mini-kegs and associated fittings. The tray can also include recesses or impressions 144 in the shape of the gas cartridge to store extra cartridges. The accessory tray 140 can also include a ring-shaped mounting portion 146 with an opening 148 sized to carry the regulator 154 (FIG. 2). In some embodiments, the ring shaped mounting portion 146 can be slotted to further facilitate assembly of the regulator 154 to the accessory tray 140. In some embodiments, the accessory tray 140 can comprise any suitable material such as plastic or rigid foam.

Figure 6:
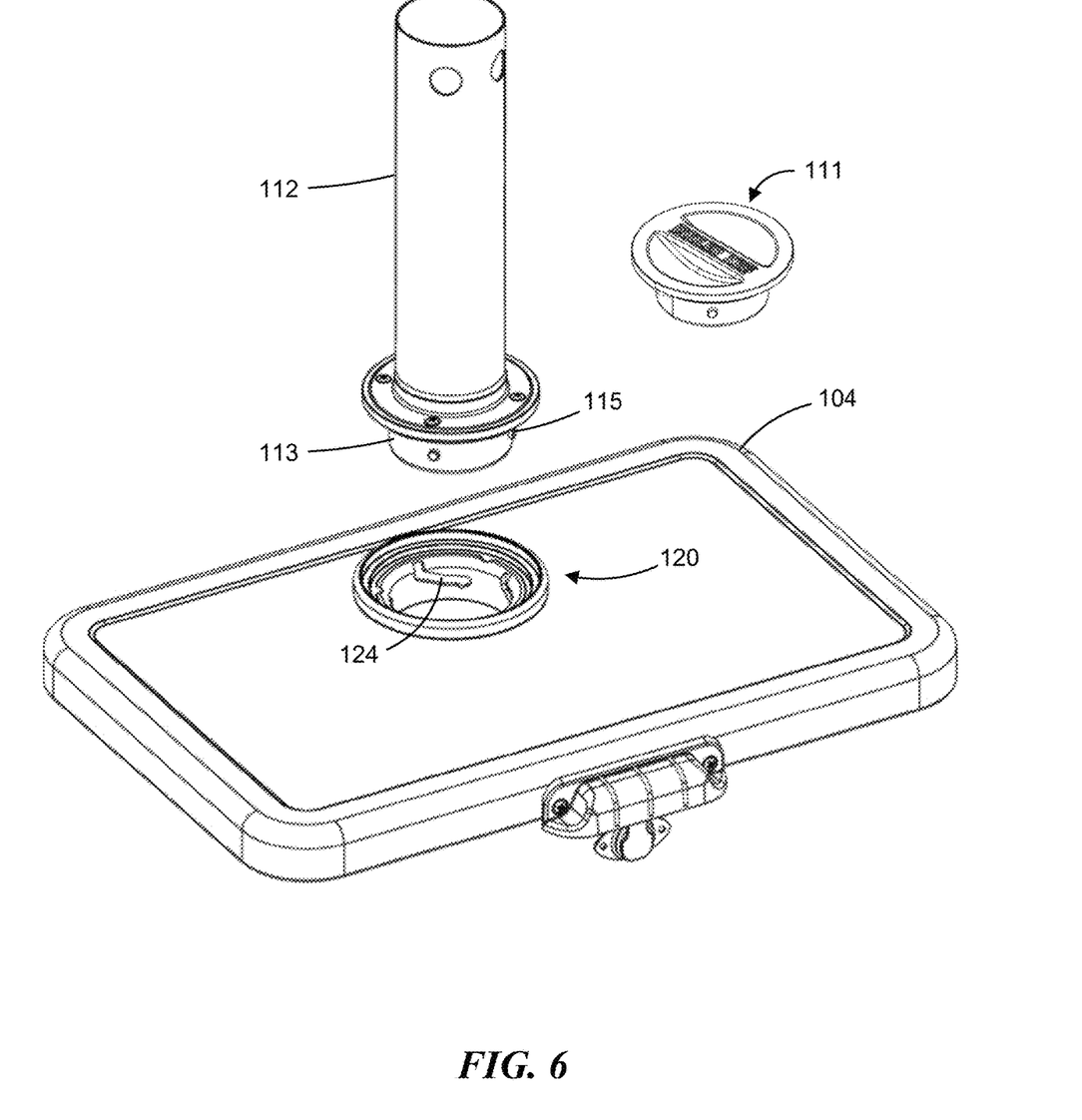
FIG. 6 is an isometric view of the tap assembly stanchion disconnected from the bulkhead fitting.

FIG. 6 illustrates the removable tap stanchion 112. The stanchion 112 can include a cylindrical stanchion fitting 113 with several transversely extending pins 115 disposed there around. The pins 115 mate with grooves 124 positioned in the bulkhead fitting 120. The grooves 124 are configured such that the stanchion fitting 113 is rotated e.g., clockwise to lock the stanchion 112 to the bulkhead fitting 120. In some embodiments, the grooves include detent features to help retain the stanchion fitting 113 in place. In some embodiments, various components of the bulkhead fitting 120 and mating stanchion fitting 113 can comprise metal such as steel or aluminum, plastic, or any other suitable material. In some embodiments, the container system 100 can also include a plug 111 configured to mate with the bulkhead fitting 120 when the removable tap stanchion 112 is removed. The plug 111 can provide further insulation and help to keep debris from entering the bulkhead fitting.

Figure 7:
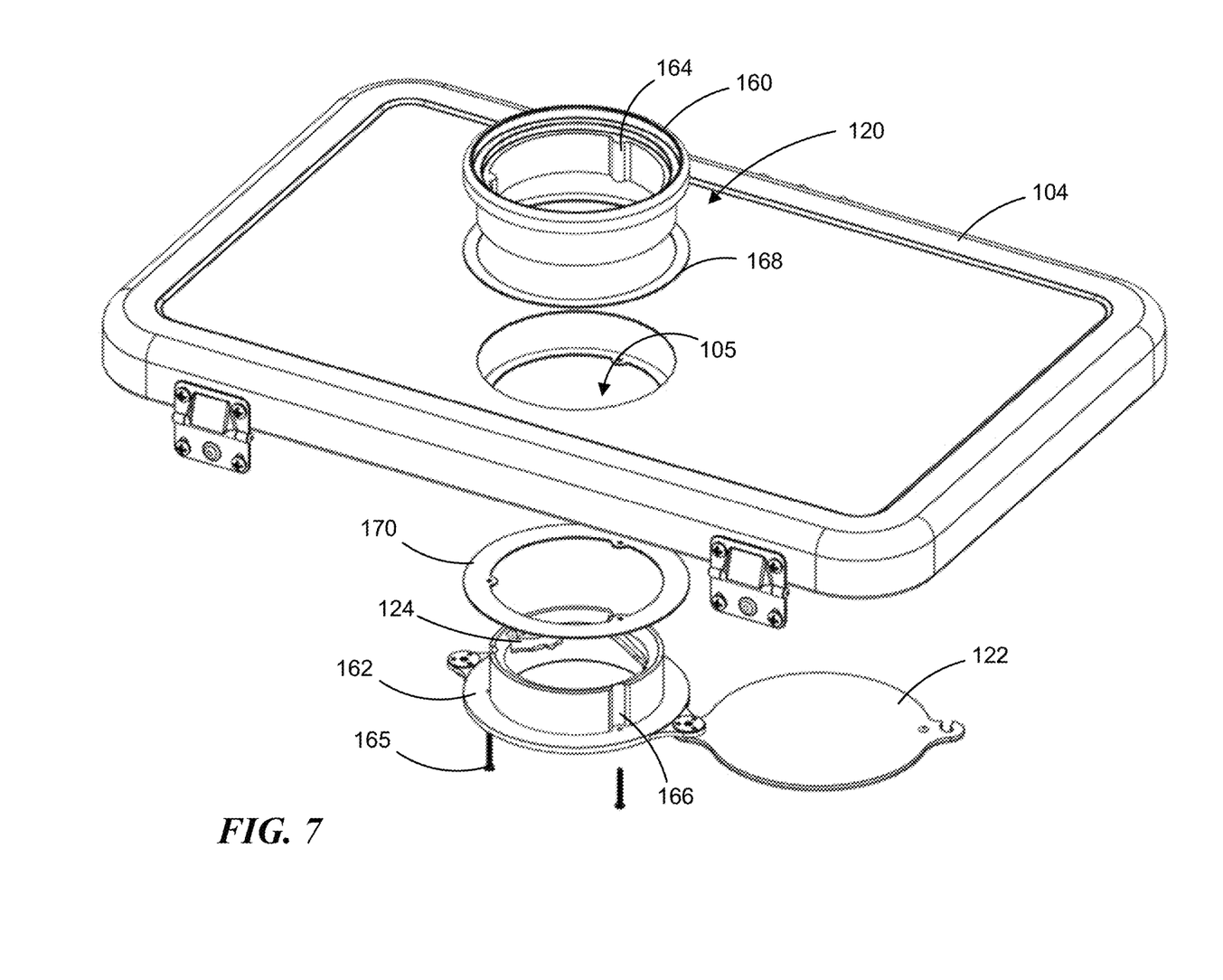
FIG. 7 is an exploded isometric view of the bulkhead fitting assembly.

FIG. 7 is an exploded view of the bulkhead fitting 120 illustrating the assembly of the fitting to the cooler lid 104. The bulkhead fitting 120 includes an upper or first portion 160 extending into an opening 105 formed in the lid 104. The upper portion 160 includes a shoulder that seals against the top of the lid 104 with a first gasket 168. A lower or second portion 162 seals against the bottom of the lid 104 with a second gasket 170 and mates with the upper portion 160. The upper portion 160 includes thread bosses 164 that mate with grooves 166 located on the lower portion 162. Suitable fasteners, such as screws 165, extend through the flange of the lower portion 162 and engage the thread bosses 164 thereby clamping the bulkhead fitting portions 160 and 162 on the lid 104.

Figure 8:
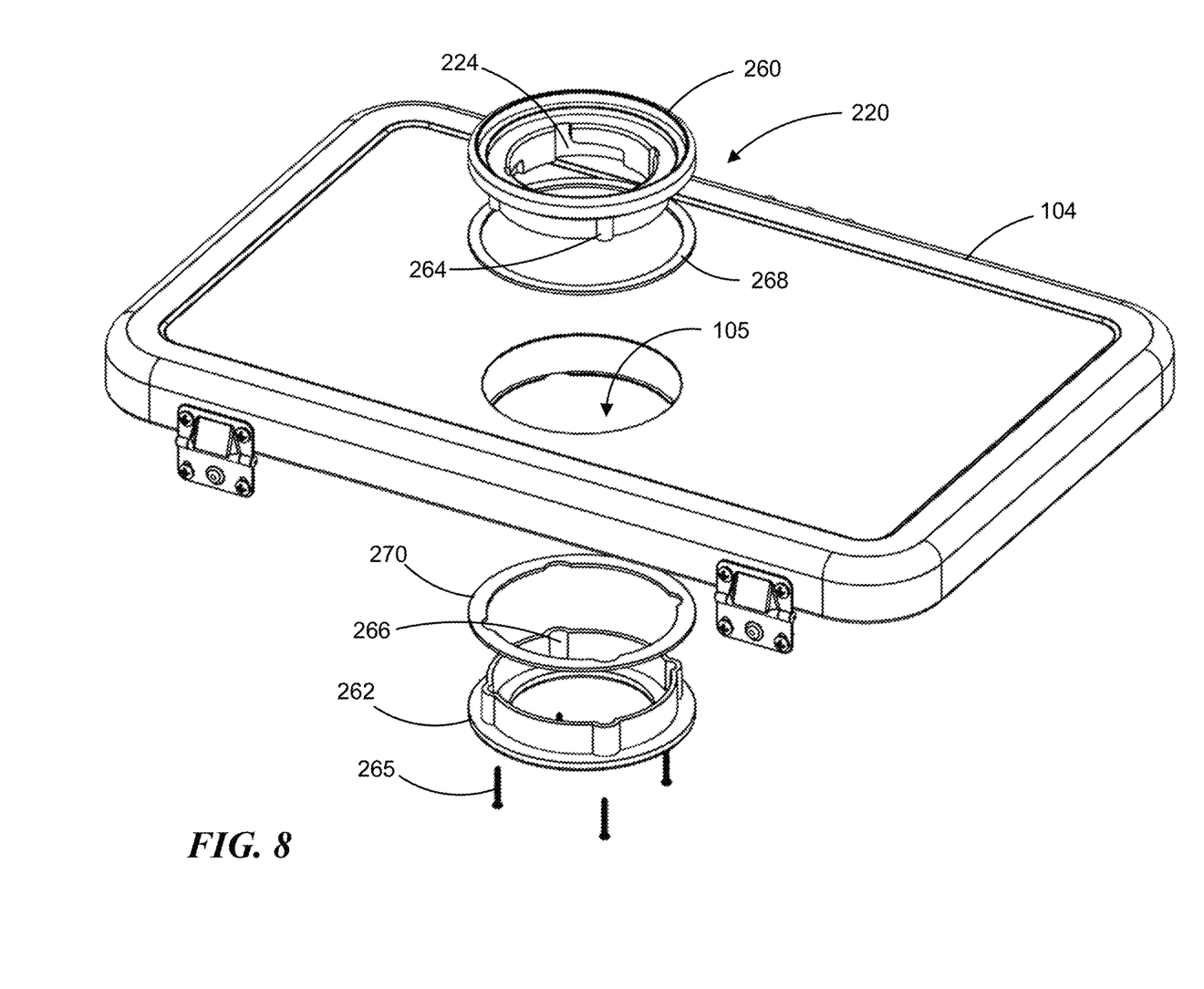
FIG. 8 is an exploded isometric view of a bulkhead fitting assembly according to another representative embodiment of the disclosed technology.

FIG. 8 is an exploded view of a bulkhead fitting 220 illustrating the assembly of the fitting to the cooler lid 104. The bulkhead fitting 220 includes an upper or first portion 260 extending into an opening 105 formed in the lid 104. The upper portion 260 includes a shoulder that seals against the top of the lid 104 with a first gasket 268. A lower or second portion 262 seals against the bottom of the lid 104 with a second gasket 270 and mates with the upper portion 260. The upper portion 260 includes thread bosses 264 that mate with grooves 266 located on the lower portion 262. Suitable fasteners, such as screws 265, extend through the flange of the lower portion 262 and engage the thread bosses 264 thereby clamping the bulkhead fitting portions 260 and 262 on the lid 104. The bulkhead fitting 220 is similar to the fitting 120 shown in FIG. 7; however, the grooves 224 are located in the upper portion 260 rather than the lower portion 262.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A container system for transporting and dispensing liquid, the system comprising:
   a container, including:
      an enclosure;
      a lid pivotably attached to the enclosure; and
      a bulkhead fitting disposed in the lid;
   a tap assembly removably connected to the bulkhead fitting;
   a base tray positioned in the enclosure, comprising one or more cooling packs having one or more recessed pockets, each configured to receive a liquid container; and
   a pivoting cover attached to the bulkhead fitting to seal the lid when the tap assembly is removed from the bulkhead fitting.

2. The container system of claim 1, wherein the base tray comprises three cooling pack sections forming two recessed pockets when positioned in the enclosure.

3. The container system of claim 2, further comprising a pair of liquid containers, each positioned in a corresponding one of the two recessed pockets.

4. The container system of claim 2, wherein each cooling pack section includes mating pins and sockets to facilitate stacking the cooling pack sections.

5. The container system of claim 1, further comprising an accessory tray positioned in the enclosure.

6. The container system of claim 5, further comprising a regulator disposed on the accessory tray.

7. The container system of claim 1, wherein the bulkhead fitting includes a first portion extending into an opening formed in the lid and a second portion mated with the first portion, and wherein the first portion includes a plurality of grooves configured such that the tap assembly is rotated to lock the tap assembly to the bulkhead fitting.

8. A container system for transporting and dispensing liquid, the system comprising:
    an insulated container, including:
        an insulated enclosure;
        an insulated lid pivotably attached to the insulated enclosure; and
        a bulkhead fitting disposed in the insulated lid;
    a tap assembly removably connected to the bulkhead fitting;
    a base tray comprising three cooling pack sections forming two recessed pockets when positioned in the insulated enclosure;
    a pair of beverage containers, each positioned in a corresponding one of the two recessed pockets and connected to the tap assembly;
    a pressure regulator connected to the pair of beverage containers; and
    a pivoting cover attached to the bulkhead fitting to seal the lid when the tap assembly is removed from the bulkhead fitting.

9. The container system of claim 8, wherein each cooling pack section includes mating pins and sockets to facilitate stacking the cooling pack sections.

10. The container system of claim 8, further comprising an accessory tray positioned in the enclosure.

11. The container system of claim 10, wherein the regulator is disposed on the accessory tray.

12. The container system of claim 8, wherein the bulkhead fitting includes a first portion extending into an opening formed in the insulated lid and a second portion mated with the first portion, and wherein the first portion includes a plurality of grooves configured such that the tap assembly is rotated to lock the tap assembly to the bulkhead fitting.

13. A container system for transporting and dispensing liquid, the system comprising:
    a bulkhead fitting attachable to a lid of a container;
    a tap assembly removably connectable to the bulkhead fitting;
    a base tray positionable in the container, comprising one or more cooling pack containers having one or more recessed pockets each configured to receive a liquid container; and
    a pivoting cover attached to the bulkhead fitting to seal the lid of the container when the tap assembly is removed from the bulkhead fitting.

14. The container system of claim 13, wherein the base tray comprises three cooling pack sections.

15. The container system of claim 14, further comprising a pair of liquid containers.

16. The container system of claim 14, wherein each cooling pack section includes mating pins and sockets to facilitate stacking the cooling pack sections.

17. The container system of claim 13, further comprising an accessory tray.

18. The container system of claim 13, further comprising a regulator.

19. The container system of claim 13, wherein the bulkhead fitting includes a first portion and a second portion mated with the first portion, and wherein the first portion includes a plurality of grooves configured such that the tap assembly is rotated to lock the tap assembly to the bulkhead fitting.

* * * * *